UNITED STATES PATENT OFFICE.

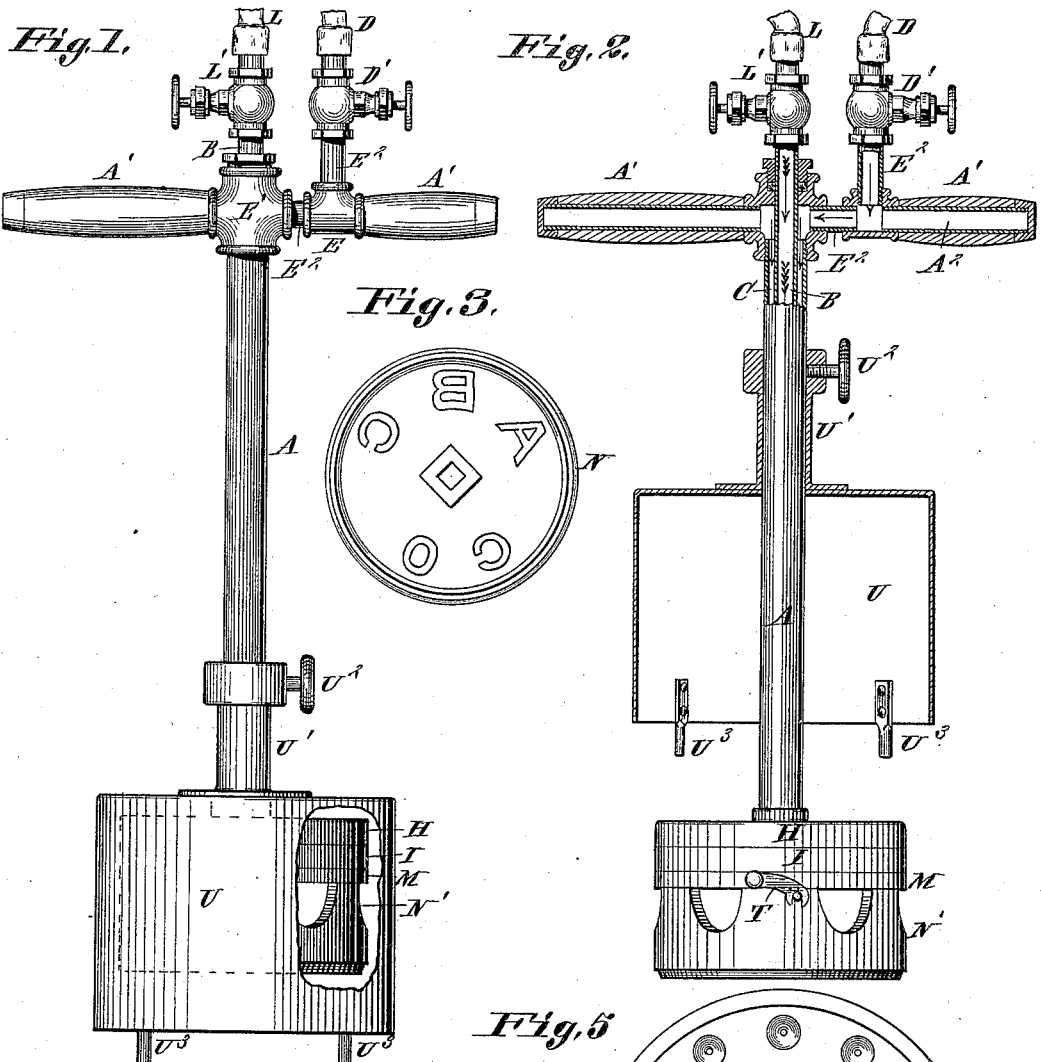

CHARLES E. C. MEYER AND WILLIAM ILLIG, OF ST. LOUIS, MISSOURI.

BRANDING APPARATUS.

SPECIFICATION forming part of Letters Patent No. 363,160, dated May 17, 1887.

Application filed August 7, 1886. Serial No. 210,320. (No model.)

*To all whom it may concern:*

Be it known that we, CHARLES E. C. MEYER and WILLIAM ILLIG, citizens of the United States, residing at the city of St. Louis, in the State of Missouri, have invented a certain new and useful Improvement in Branding Apparatuses, of which the following is a full, clear, and exact description, reference being had to the accompanying drawings, forming part of this specification, and in which—

Figure 1 is a side elevation of our improved branding apparatus with part of the casing broken away and the casing in its lower position. Fig. 2 is a vertical section through the upper part of the apparatus and through the casing, the lower part of the apparatus being shown in side view and the casing being raised into the position it occupies when the apparatus is in use. Fig. 3 is a bottom view of the branding-plate. Fig. 4 is an enlarged vertical section of the lower part of the apparatus, where the mixing of the air and gas is illustrated by arrows. Fig. 5 is a top view of the plate located between the mixing-chamber and the combustion-chamber.

Our invention relates to certain improvements in branding apparatuses; and our invention consists in features of novelty, hereinafter fully described, and pointed out in the claims.

Referring to the drawings, A represents a hollow stem or sleeve, within which is located a tube, B, a space, C, being left between the two parts for the passage of the air, as indicated by the featherless arrows in Figs. 2 and 4, the air entering this chamber C through a hose or pipe, D, and valve D', which is connected to a coupling, E, and cross E' by short pipes $E^2$. The air passes from the inner pipe, $E^2$, to the chamber C, between the stem A and tube B, and passing down this chamber enters an air-chamber, F, in the head G of the brand, this chamber being formed by means of disks H and I, the disk H having a marginal downturned flange, H', that rests upon the periphery of the disk I. The disk I has perforations I', for the passage of the air from the chamber F to a mixing-chamber, J, and at the openings I' the disk is preferably provided with lips or projections $I^2$, which provide for an elongation of the openings I', which are preferably made tapering, as shown in Fig. 4, so that the air will be projected or forced into the mixing-chamber J in small jets.

Onto the upper end of the tube or pipe B is connected a gas hose or pipe, L, and the upper end of the tube is provided with a valve, L'. The gas entering this tube passes down (as shown by the full arrows) into the mixing-chamber J, where it is commingled with the air. From this mixing-chamber the air and gas pass in a united condition through openings M', made in a disk, M, located beneath the disk I, and which, with the disk I, forms the mixing-chamber, the disk I having a marginal downturned flange resting upon the disk M. The openings M' are preferably made tapering, so that the air and gas escape through them in small jets, and they are also preferably arranged directly beneath the openings I', as shown in Fig. 4.

As the air and gas escape through the openings M' they enter a combustion-chamber, N, formed by a cup-shaped disk, N', upon which the disk M fits and is held by a suitable screw, O.

The disk N' has perforations $N^2$ to allow the entrance of air into the combustion-chamber and to allow the escape of the products of combustion. On the bottom of the cup-disk N' are made the letters or matter forming the brand, as shown in Fig. 3, which are formed integral with the cup-disk, and which are heated by the jets of flame in the combustion-chamber.

The disks H, I, and M are connected together by rivets or bolts P, or other suitable means. When the disk N' is connected to the disk M and the other disks by the screw O, as stated, it may be held from unscrewing by means of a suitable catch, T, as shown in Fig. 2, and this catch would preferably be placed on what would be the upper side or top of the head of the apparatus when in use, so as to indicate upon which side of the face of the instrument the bottom of the brand appears.

Upon the top of the stem A is formed a handle, A', which, together with the stem, constitutes a cruciform connection, the handle being the branches, by which the apparatus is used. This handle is preferably hollow or made with a chamber, $A^2$, which communicates with the air-pipe, and thus forms a coldair chamber, which tends to keep the handle from being heated through means of heat conducted through the stem, and which also serves to contain a supply of air.

We prefer to locate without the outside of the head G of the brand a casing, U, provided with a neck, U', having a set-screw, $U^2$, by which it is made fast to the stem A. This casing is preferably provided with short legs or feet $U^3$, which act to hold its bottom off the support upon which the apparatus is placed, so that the air can enter beneath the casing. When the apparatus is not in use, this casing is lowered into the position shown in Fig. 1, where it is held upon the stem A by the set-screw $U^2$, and when in this position it incloses the head G of the apparatus. This holds the head of the apparatus up off of the support, so that the latter is not burned when the apparatus is placed upon it.

When the apparatus is to be used, the casing is raised up out of the way, as shown in Fig. 2, and held in this position by tightening the set-screw $U^2$.

We claim as our invention—

1. In a branding apparatus, in combination with the hollow stem and pipe located within the stem, the head composed of disks having annular flanges, the flange on each disk being in contact with the outer edge of its adjacent disk, and suitable means for securing the disks together, substantially as set forth.

2. In a branding apparatus, in combination with the air-chamber, mixing-chamber, combustion-chamber, and the perforated plate between the latter, the branding-disk having a central screw-connection with the perforated plate and a catch for preventing them from unscrewing, substantially as set forth.

3. In a branding apparatus, the combination, with flanged disks H and I and disk M, all secured together by bolts or rivets, of flanged branding-plate N, having suitable means for securing it removably to disk M, and pipes secured to disks H and I, substantially as and for the pupose set forth.

4. In a branding apparatus, in combination with the stem and body, the adjustable casing, substantially as and for the purpose set forth.

5. In a branding apparatus, in combination with the stem and body, an adjustable casing provided with legs and a set screw by which it is secured to the stem, substantially as and for the purpose set forth.

CHARLES E. C. MEYER.
WILLIAM ILLIG.

In presence of—
GEO. H. KNIGHT,
JOE WAHLE.